United States Patent [19]

Ikeda et al.

[11] 4,314,009
[45] Feb. 2, 1982

[54] BATTERY

[75] Inventors: Hironosuke Ikeda, Hirakata; Shigehiro Nakaido, Kobe, both of Japan

[73] Assignee: Sanyo Electric Co., Ltd., Moriguchi, Japan

[21] Appl. No.: 212,204

[22] Filed: Dec. 2, 1980

[30] Foreign Application Priority Data

Dec. 7, 1979 [JP] Japan .......................... 54/170028[U]
Dec. 7, 1979 [JP] Japan .......................... 54/170029[U]
Jan. 30, 1980 [JP] Japan ............................ 55-11062[U]

[51] Int. Cl.³ .......................................... H01M 2/26
[52] U.S. Cl. ..................................... 429/161; 429/178
[58] Field of Search ....................... 429/178, 180–183, 429/160, 161, 152, 179

[56] References Cited

U.S. PATENT DOCUMENTS 3,116,172 12/1963 Wilke et al. ................. 429/178 X
3,285,785 11/1966 Shannon ............................ 429/182
3,427,205 2/1969 Plitt et al. ........................... 429/183
3,762,958 10/1973 Kuylenstiema .................... 429/160

Primary Examiner—Anthony Skapars
Attorney, Agent, or Firm—Darby & Darby

[57] ABSTRACT

The present application discloses a battery comprising: an electrode assembly formed by alternately superposing each of at least two electrode plates having one polarity and at least one electrode plate having the other polarity with each of separator layers therebetween; a battery vessel for housing the electrode assembly and constituted by a metallic outer case and a metallic closure cover joined to the metallic outer case; a collector rod having a flange located inside the closure cover, the collector rod passing through a through-bore formed in the closure cover, through an insulating member so that one end of the collector rod is projected from the closure cover; and a metallic ring fitted to the projected portion of the collector rod with an insulating member disposed between the metallic ring and the closure cover.

According to the battery of the present invention, the head of the projected portion of the collector rod is crushed and this crushed portion is embedded in a concave portion formed in the top surface of the ring.

According to the battery of the present invention, said electrode plates having said one polarity are electrically connected to the battery vessel, and said at least one electrode plate having said other polarity are electrically connected to the collector rod.

According to the battery of the present invention, the collector rod is rigidly secured to the closure cover, thereby to provide higher air-tightness and to improve the effect of current collecting of the respective electrode plates with easier assembling.

7 Claims, 7 Drawing Figures

BATTERY

FIELD OF THE INVENTION

The present invention relates to a battery in which at least two electrode plates having one polarity and at least one electrode plate having the other polarity are alternately superposed on each other with separator layers therebetween, thereby to form an electrode assembly, which is housed in a battery vessel constituted by a metallic outer case and a metallic closure cover joined to the metallic outer case, said electrode plates having said one polarity being electrically connected to said battery vessel and said at least one electrode plate having said other polarity being electrically connected to a collector rod, which is projected from said closure cover through an insulating member.

BACKGROUND OF THE INVENTION

There has conventionally been known a battery in which at least two electrode plates having one polarity and at least one electrode plate having the other polarity are alternately superposed on each other with separator layers therebetween, thereby to form an electrode assembly, which is housed in a battery vessel constituted by a metallic outer case and a metallic closure cover joined to this metallic outer case, said electrode plates having said one polarity being electrically connected to said battery vessel and said at least one electrode plate having said other polarity being electrically connected to a collector rod, which is projected from said closure cover through an insulating member. In such conventional battery, the projection of the collector rod from the closure cover is realized in such a manner that a through-bore is formed in the closure cover and the collector rod passes, at one end thereof, through this through-bore through the insulating member and a nut is threaded to a screw groove formed in this projected portion of the collector rod, thereby to fix the collector rod and the closure cover to each other. However, such construction presents a defect that the nut is loosened so that high air-tightness cannot be provided in the battery vessel.

Furthermore, in such conventional battery, the electric connection of the electrode plates having one polarity to the outer case is performed in such a way that the outer diameters of the electrode plates having said one polarity are the substantially same as the inner diameter of the outer case, so that the peripheries of the electrode plate shaving said one polarity come in contact with the inner wall of the outer case when such electrode plates are housed in the outer case. However, such arrangement requires to pay much attention to dimensional accuracy of the outer diameters of the electrode plates having said one polarity. That is, if the outer diameters of the electrode plates having said one polarity are relatively small with respect to the inner diameter of the outer case, the contact of the electrode plates having said one polarity with the outer case is not sufficient, thereby to reduce the effect of current collecting, although the battery assembling work is facilitated. On the other hand, if the outer diameters of the electrode plates having said one polarity are relatively large with respect to the inner diameter of the outer case, there is a possibility of the peripheries of such electrode plates falling into pieces at the assembling time and therefore the battery assembling work becomes difficult.

DISCLOSURE OF THE INVENTION

A battery according to the present invention comprises: an electrode assembly formed by alternately superposing each of at least two electrode plates having one polarity and at least one electrode plate having the other polarity with each of separator layers therebetween; a battery vessel for housing the electrode assembly and constituted by a metallic outer case and a metallic closure cover joined to the metallic outer case; a collector rod having a flange located inside the closure cover, the collector rod passing through a through-bore formed in the closure cover, through an insulating member so that one end of the collector rod is projected from the closure cover; and a metallic ring fitted to the projected portion of the collector rod with an insulating member disposed between the metallic ring and the closure cover; the head of the projected portion of the collector rod being crushed, said crushed portion being embedded in a concave portion formed in the top surface of the ring, said electrode plates having said one polarity being electrically connected to said battery vessel, said at least one electrode plate having said other polarity being electrically connected to said collector rod.

BRIEF DESCRIPTION OF THE DRAWINGS

The invention will be further discussed, by way of example, with reference to the accompanying drawings, in which.

DETAILED DESCRIPTION OF PREFERRED EMBODIMENTS

The description hereinafter will discuss a first embodiment of the present invention with reference to FIGS. 1 to 4.

A cylindrical outer case 1 having a bottom is made of metal such as stainless steel, and simultaneously forms the terminal having a positive polarity of a battery. A closure cover 2 closes the opening of the outer case 1 and is made of metal such as stainless steel.

Positive electrode plates 3A, 3B and 3C have outer diameters slightly smaller than the inner diameter of the outer case 1. The positive electrode plates 3A and 3B have through-bores at the center portions thereof.

Figure 3:
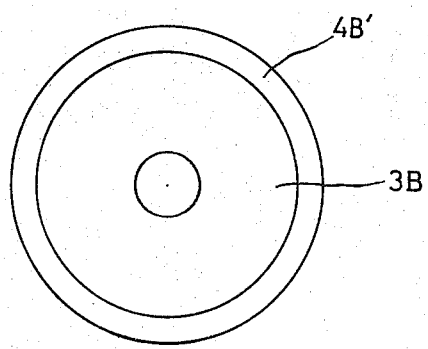
FIG. 3 is a plan view of one of electrode plates having one polarity used in the battery in FIG. 2.
Figure 4:
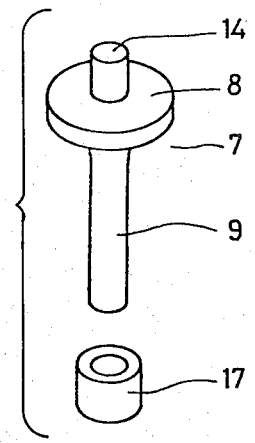
FIG. 4 is a perspective view of a collector rod and a resilient insulating member used in the battery in FIG. 2.

Flat collector members 4A, 4B and 4C are embedded in the positive electrode plates 3A, 3B and 3C, respectively, and are made of porous conductive material such as a stainless steel net. Among the collector members 4A, 4B and 4C, at least the collector member 4B for the central positive electrode plate 3B has a diameter larger than that of the positive electrode plate 3B and is annularly projected from the peripheral edge of the positive electrode plate 3B as shown in FIG. 3. The outer diameter of this annularly projected portion 4B' of the collector member 4B has a diameter slightly larger than the inner diameter of the outer case 1.

Negative electrode plates 5A and 5B have diameters smaller than the inner diameter of the outer case 1. A negative collector plate 5B' is disposed below the lower negative electrode plate 5B. The negative electode plates 5A and 5B have through-bores at the center portions thereof.

Separator layers 6A, 6B, 6C and 6D impregnated with an electrolyte are disposed between the positive electrode plate and the negative electrode plate, respectively. Except the lowest separator layer 6D, the separator layers 6A, 6B and 6C have through-bores at the center portion thereof.

A collector rod 7 has a flange 8 integrally formed therewith and a collector portion 9 under the flange 8.

An insulating member 10 is fitted in a through-bore formed in the center of the closure cover 2. An insulating member 11 is disposed on the flange 8 of the collector rod 7. With the flange 8 disposed inside the closure cover 2, the upper portion of the collector rod 7 passes through the through-bore of the insulating members 11 and 10. Thus, the upper portion of the collector rod 7 is projected from the closure cover 2.

An insulating member 12 is disposed on the closure cover 2 and is passed through by the upper portion of the collector rod 7. The insulating members 10, 11 and 12 may be made of, for example, polypropylene, polyethylene or fluoric resins polymers.

A metallic ring 13 is fitted to the projected portion 14 of the collector rod 7 and has, at the top surface thereof, a concave portion 15 in the reverse conic shape. The head of the projected portion 14 of the collector rod 7 is crushed by pressing jig means and is embedded in the concave portion 15. The projected portion 14 and the ring 13 are thus fixed to each other. The closure cover 2 is held by and between the flange 8 and the ring 13 through the insulating members 10, 11 and 12, and the collector rod 7 is fixed to the closure cover 2.

A resilient insulating member 17 is disposed, in a contracted state, in the through-bore in the central positive electrode plate 3B, and may be made of a resilient rubber ring.

The description hereinafter will discuss the assembling of the battery described hereinbefore.

The positive electrode plate 3C and the separator layer 6D are disposed in the outer case 1. With the collector rod 7 fixed to the closure cover 2, the positive electrode plate 3A, the separator layer 6A, the negative electrode plate 5A, the separator layer 6B and the positive electrode plate 3B are successively disposed under the closure cover 2. The resilient insulating member 17 is disposed in the through-bore in the positive electrode plate 3B. The separator layer 6C, the negative electrode plate 5B and the negative collector plate 5B' are further disposed under the positive electrode plate 3B. Then, the negative collector plate 5B' is spot-welded to the lower end of the collector portion 9, so that these members are formed into a unit. This unit is then inserted into the outer case 1, and the opening periphery of the outer case 1 and the turned periphery of the closure cover 2 are joined to each other. This joined portion is sealed by laser welding or electron beam welding. At this time, the uppermost positive electrode plate 3A is electrically connected directly to the lower surface of the closure cover 2, and the central positive electrode 3B is electrically connected to the outer case 1 with the projected portion 4B' of the collector member 4B came in resilient contact with the inner wall of the outer case 1, and the lowest positive electrode plate 3C is electrically connected directly to the bottom of the outer case 1. The upper negative electrode plate 5A is electrically connected to the collector portion 9 of the collector rod 7 inserted into the through-bore in the negative electrode plate 5A, and to the lower side of the flange 8, and the lower negative electrode plate 5B is electrically connected to the collector portion 9 inserted into the through-bore in the negative electrode plate 5B, and to the lower end of the collector portion 9 through the negative collector plate 5B'.

With such arrangement, the upper portion of the collector rod 7 passes through the through-bore in the closure cover 2, through the insulating members 10, 11 and 12, so that one end of the collector rod 7 is projected from the closure cover 2. The metallic ring 13 is fitted to thus formed projected portion 14 of the collector rod 7 and the head of this projected portion 14 crushed. The crushed portion 16 is then embedded in the concave portion 15 of the ring 13. The collector rod 7 is thus rigidly secured to the closure cover 2, providing high air-tightness in the battery vessel. The top surface of the ring 13 is smoothened, thereby to be effectively utilized as one terminal of the battery.

Furthermore, since the collector rod 7 has the rod-shape collector portion 9 under the flange 8 and this collector portion 9 passing through the through-bore in the central positive electrode plate 3B with a gap therebetween is electrically connected to the lower negative electrode plate 5B, a plurality of negative electrode plates may readily be electrically connected to each other.

Moreover, the collector member 4B is annularly projected from the peripheral edge of the central positive electrode plate 3B sandwiched by two negative electrode plates 5A and 5B, and such projected portion 4B' is press-contacted with and electrically connected to the inner wall of the outer case 1. It is therefore possible to form the outer diameter of the positive electrode plate 3B as smaller than the inner diameter of the outer case 1, thus enabling the battery assembling work to be facilitated to a great extent and permitting the electrical contact of the positive electrode plate 3B with the outer case 1 to be maintained in a good condition.

In the embodiment above-mentioned, there is discussed a case where the collector member 4B is annularly projected from the peripheral edge of the centrally located positive electrode plate 3B, among a plurality of positive electrode plates 3A, 3B and 3C. Why such structure is adopted is because, as apparent from FIG. 1, one sides of the uppermost and lowest positive electrode plates 3A and 3C come in contact with the outer case 1 and the closure cover 2 simultaneously forming the terminal of the battery, respectively, under stacking pressure, thereby to provide a good electrical contact therebetween, respectively. However, if the same collector structure for the central positive electrode plate 3B is adopted for the uppermost and lowest positive electrode plates 3A and 3C, the effect of current collecting may further be improved.

Furthermore, since the resilient insulating member 17 is disposed in the through-bore in the central positive electrode plate 3B, the resilient force of the resilient insulating member 17 in the vertical direction enables the upper negative electrode plate 5A to be press-contacted with the lower surface of the flange 8 of the collector rod 7 and also enables the lower negative electrode plate 5B to be press-contacted with the negative collector plate 5B', so that the effect of current collecting of the negative electrode plates 5A and 5B may be enhanced Moreover, since the lower end of the collector portion 9 of the collector rod 7 is welded to the negative collector plate 5B', the closure cover 2, the positive electrode plates 3A and 3B and the negative electrode plates 5A and 5B may be formed into a unit, thus permitting the assembling work to be facilitated.

The description hereinafter will discuss other example of the collector rod 7 with reference to FIG. 5.

Figure 5:
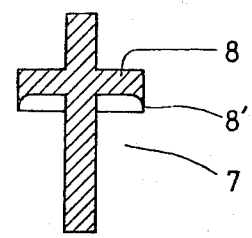
FIG. 5 is a section view in front elevation of other example of the collector rod.

In FIG. 5, the collector rod 7 has an annular projection 8' at the lower face of the flange 8. This projection 8' bites into the upper surface of the negative electrode plate 5A, so that the effect of current collecting of the collector rod 7 may be enhanced.

The description hereinafter will discuss a second embodiment of the battery in accordance with the present invention.

Figure 1:
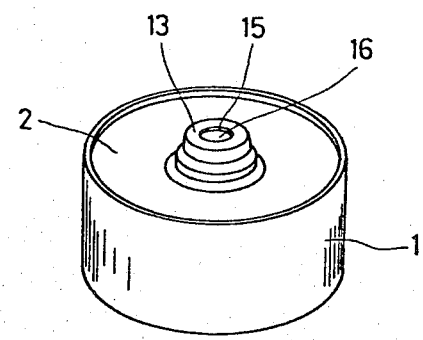
FIG. 1 is a perspective view of a first embodiment of battery in accordance with the present invention.
Figure 2:
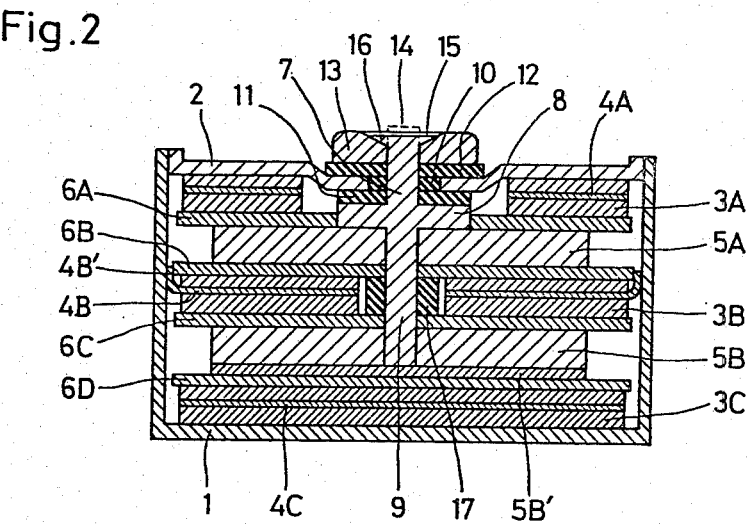
FIG. 2 is a section view in front elevation of the battery in FIG. 1.
Figure 6:
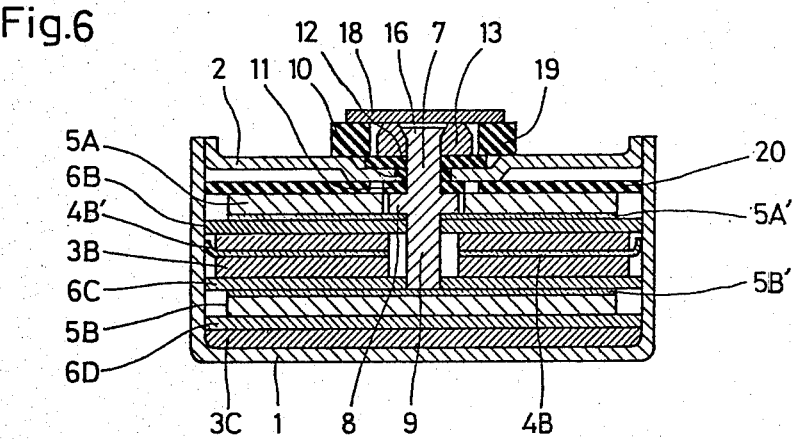
FIG. 6 is a section view in front elevation of a second embodiment of battery in accordance with the present invention.

In FIG. 6, like parts are designated by like numerals in FIG. 2.

A circular negative terminal plate 18 having a diameter larger than that of the metallic ring 13 is spot-welded to the top surface of the ring 13. An insulating ring 19 is disposed at the periphery of the ring 13, thereby to assure insulation of the negative terminal plate 18 from the closure cover 2.

In the second embodiment in FIG. 6, there is not disposed the uppermost positive electrode plate 3A in FIG. 2, but an insulating plate 20 is disposed between the upper negative electrode plate 5A and the closure cover 2. A negative collector plate 5A' disposed under the upper negative electrode plate 5A is joined to the lower surface of the flange 8 of the collector rod 7. The negative electrode plate 5A is electrically connected to the collector rod 7 through the negative collector plate 5A'.

The negative collector plate 5B' for the lower negative electrode plate 5B is disposed on the negative electrode plate 5B and the lower end of the collector rod 7 is electrically connected to the upper surface of the negative collector plate 5B'.

Accordingly, in the second embodiment, since the negative terminal plate 18 is rigidly secured to the top surface of the metallic ring 13, the terminal plate may suitably be selected in shape and dimensions. It is therefore possible to form a terminal portion having a large contact area dependent on the applications and also it is possible to improve the external appearance of the terminal, so that the commercial value may be heightened.

If a metallic ring having a large diameter is used as the ring 13, the fastening pressure for the crushed portion 16 of the collector rod 7 is dispersed, so that the collector rod 7 cannot securely be fixed to the closure cover 2. According to the second embodiment in FIG. 6, a small diameter metallic ring 13 may be used, thereby to secure such fixation.

In order to further improve the electric contact between the lower negative electrode plate 5B and the collector rod 7, a resilient member such as a spring may be disposed between the lowest positive electrode plate 3C and the inner bottom surface of the outer case 1, so as to apply spring-load to the electrode assembly in the upward direction, thereby to strengthen the press-contact of the negative collector plate 5B' with the collector rod 7. Alternatively, the negative collector plate 5B' may be securely spot-welded to the lower end of the collector rod 7.

The description hereinafter will discuss other example of a negative terminal plate with reference to FIG. 7.

Figure 7:
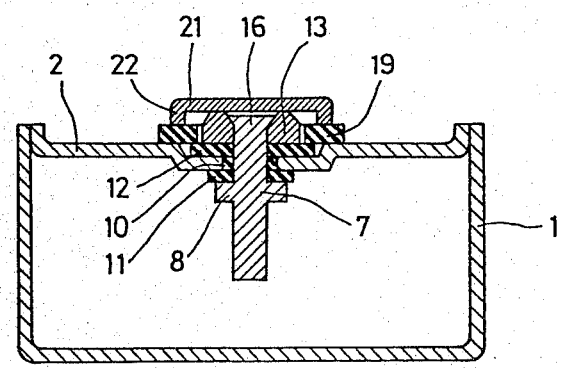
FIG. 7 is a section view in front elevation of other example of a negative terminal plate used in battery of the present invention.

In FIG. 7, a negative terminal plate 21 has a turning portion 22 formed by downwardly turning the circular periphery of the negative terminal plate 21. The lower end of the turning portion 22 bites into an insulating ring 19. If the terminal plate is flat as shown in FIG. 6, there is a possibility of the periphery of the terminal plate upwardly bending and coming off from the metallic ring 13. However, the negative terminal plate 21 shown in FIG. 7 may advantageously reduce such inconvenience.

Although there have been discussed the embodiments in which at least two positive electrode plates and at least two negative electrode plates are used, it is understood that the present invention may be applied to a battery in which there is used an electrode assembly comprising two electrode plates having one polarity electrically connected to the battery vessel and one electrode plate having the other polarity electrically connected to the collector rod and sandwiched between said two electrode plates having said one polarity.

INDUSTRIAL UTILITY

According to the battery of the present invention, the metallic ring 13 is fitted to the projected portion 14 of the collector rod 7 projecting from the closure cover 2, the head of the projected portion 14 is crushed and this crushed portion 16 is embeded in the concave portion 15 of the metallic ring 13. Accordingly, the collector rod 7 is rigidly secured to the closure cover 2, whereby high airtightness may be provided in the battery vessel and the surface of the metallic ring 13 may be smoothened, thereby to be effectively utilized as a terminal portion.

Furthermore, according to the present invention, a plurality of electrode plates may readily be electrically connected and the assembling work may be facilitated, owing to the provision of the collector portion 9 under the flange 8 of the collector rod 7 and the projected portion 4B' of the collector member 4B annularly projecting from the peripheral edge of the positive electrode plate 3B.

What we claim is:
1. A battery comprising:
  an electrode assembly formed by alternately superposing each of at least two electrode plates having one polarity on at least one electrode plate having the other polarity with each of separator layers disposed therebetween;
  a battery vessel for housing said electrode assembly and constituted by a metallic outer case and a metallic closure cover joined to said metallic outer case;
  a collector rod having a flange located inside said closure cover, said collector rod passing through a through-bore formed in said closure cover, through an insulating member such that one end of said collector rod is projected from said closure cover; and a metallic ring fitted to the projected portion of said collector rod with an insulating member disposed between said ring and said closure cover;

the head of said projected portion of said collector rod being crushed, said crushed portion being embedded in a concave portion formed in the top surface of said ring, said at least two electrode plates having said one polarity being electrically connected to said battery vessel;

said at least one electrode plate having said other polarity being electrically connected to said collector rod.

2. The battery as set forth in claim 1, wherein at least two electrode plates having said other polarity are disposed, the collector rod has a rod-shape collector portion under the flange which is electrically connected to the uppermost electrode plate having said other polarity, said collector portion is inserted into a through-bore formed in the electrode plate having said one polarity located under said uppermost electrode plate having said other polarity, with a gap provided between said collector portion and said electrode plate having said one polarity, and the lower end of said collector portion is electrically connected to the electrode plate having said other polarity located under said electrode plate having said one polarity.

3. The battery as set forth in claim 2, further comprising a collector member having a projected portion projected from the peripheral edge of the electrode plate having said one polarity sandwiched two electrode plates having said other polarity, said projected portion of said collector member being press-contacted with the inner wall of the outer case, thereby to be electrically connected thereto.

4. The battery as set forth in claim 2, wherein a resilient insulating member is disposed in said gap between the collector portion of the collector rod and said electrode plate having said one polarity, so that the resilient force of said resilient insulating member causes the electrode plate having said other polarity located on said electrode plate having said one polarity, to be press-contacted with the lower side of the flange of the collector rod, and also causes the electrode plate having said other polarity located under said electrode plate having said one polarity, to be press-contacted with a collector plate disposed under said last-mentioned electrode plate having said other polarity, said collector plate being electrically connected to the lower end of the collector portion.

5. The battery as set forth in claim 4, wherein the lower end of the collector portion of the collector rod is securely welded to said collector plate.

6. The battery as set forth in claim 2, wherein the collector rod is provided at the lower side of the flange thereof with annularly projection biting into the electrode plate having said other polarity located under said flange.

7. The battery as set forth in claim 1 or 6, wherein a terminal plate having said other polarity is secured to the top surface of the metallic ring, said terminal plate having a diameter larger than that of said ring.

* * * * *